United States Patent [19]
Matoba

[11] Patent Number: 5,263,232
[45] Date of Patent: Nov. 23, 1993

[54] CORD STOPPER

[75] Inventor: Hiroshi Matoba, Toyama, Japan

[73] Assignee: Yoshida Kogyo K. K., Tokyo, Japan

[21] Appl. No.: 960,879

[22] Filed: Oct. 14, 1992

[30] Foreign Application Priority Data

Oct. 17, 1991 [JP] Japan .................................. 3-093144

[51] Int. Cl.⁵ ............................................. F16G 11/00
[52] U.S. Cl. ................... 24/115 G; 24/136 L
[58] Field of Search ............ 24/115 G, 115 M, 115 R,
24/115 H, 136 R, 136 L, 49 S, 303, 712, 712.1,
713.2, 714.6; 403/211, 353

[56] References Cited

U.S. PATENT DOCUMENTS

| 2,476,088 | 7/1949 | Gleason | 403/353 |
| 3,080,867 | 3/1963 | Eichinger | 24/115 G |
| 4,328,605 | 5/1982 | Hutchison et al. | 24/115 G |
| 4,393,550 | 7/1983 | Yang et al. | 24/117 |
| 4,782,560 | 11/1988 | Keller | 24/136 L |
| 4,967,454 | 11/1990 | Elieff | 24/712.1 |

FOREIGN PATENT DOCUMENTS

| 0514044A2 | 11/1992 | European Pat. Off. |  |
| 1276059 | 10/1961 | France | 24/115 G |
| 5-6753 | 11/1930 | Japan . |  |
| 60-41125 | 12/1985 | Japan . |  |
| 63-117308 | 7/1988 | Japan . |  |
| 63-175911 | 11/1988 | Japan . |  |
| 2066891 | 7/1981 | United Kingdom | 24/115 G |

Primary Examiner—Victor N. Sakran
Attorney, Agent, or Firm—Hill, Steadman & Simpson

[57] ABSTRACT

A cord stopper comprises a double-headed plug having a pair of through holes formed one through each plug heads perpendicularly to the longitudinal axis thereof; a pair of sockets each reciprocally fitted over the respective plug head and having a pair of apertures formed through the periphery thereof; and a pair of springs for normally urging the sockets away from each other. When the sockets are fully compressed against the bias of the spring, the apertures come into registry with the respective through holes for letting a string through.

8 Claims, 3 Drawing Sheets

CORD STOPPER

BACKGROUND OF THE INVENTION

1. Field of the Invention

The present invention relates to a cord stopper for pulling taut and fastening both ends of a string wrapped around or attached in a loop to a garment, a bag, shoes, etc.

2. Description of the Related Art

A typical example of cord stoppers of the type concerned is described in Japanese Utility Model Publication No. 63-117308. This conventional cord stopper generally comprises a socket in the shape of a hollow cylinder having two pairs of apertures formed in the periphery, one aperture of each pair diametrically opposed to the other; a pair of plugs each reciprocally mounted into the respective end of the socket and each having a through hole formed perpendicularly thereto; and a pair of compression coil spring mounted substantially in the middle of the hollow socket urging the plugs away from each other; the arrangement of the through holes and the apertures being such that the through hole comes into registry with the diametrically opposed apertures when the plug being fully thrusted into the hollow socket against the bias of the spring. For fastening both ends of a string with the cord stopper, first the opposed plugs are compressed against bias of the compression spring to thus bring the through hole of the plug into registry with the diametrically opposed apertures of the sockets, whereupon the wearer can readily insert the ends of the string through the respective holes and apertures. As soon as he releases his fingers from the plugs after insertion of the string, the plugs are restored to its original position under the bias of the compression spring, causing the through holes and diametrically-opposed apertures out of registry, so that the end of the string are caught by the edges of the holes and apertures.

FIG. 6 shows a cord stopper being used for fastening a string 1 wrapped round a waist of a ladies" garment. The garment has an inner hose 2 arranged around the waistline inside thereof. The inner hose 2 is defined as between an outer fabric of the garment and an lining cloth and used for inserting of the string 1 therethrough. After the string 1 is inserted through the inner hose 2, both ends of the string 1 coming out of an opening 3 of the hose 2 are pulled taut through the cord stopper and fastened to each other thereby.

However, the conventional cord stopper has the two compression coil spring between the opposed plugs. This intrinsically requires an increased distance between the opposed pairs of apertures formed in the socket. On the contrary, the opening 3 of the inner hose 2 is formed as small as possible for sightliness of the garment. The ends of the string coming out of the small opening 3 and diverging into the far-spaced apertures of the cord stopper are ugly, thus damaging the appearance of the garment as a whole. No matter how taut the string may be pulled, the cord stopper will never come close to the opening 3 of the garment due to such divergency of the string ends, which make the garment as a whole further unsightly. Furthermore, repeated pulling of the string taut in this condition could be liable to even damage the edge of the small opening of the garment hose 2.

SUMMARY OF THE INVENTION

With the foregoing difficulties in view, it is therefore an object of the present invention to provide a cord stopper in which the distance between a pair of through holes of a plug for inserting of a string is decreased to minimum.

According to the present invention, there is provided a cord stopper for fastening a string comprising a double-headed plug including a pair of plug heads integrally joined bottom-to-bottom with each other and a pair of through holes formed one through each plug heads perpendicularly to the longitudinal axis thereof; a pair of sockets each reciprocally fitted over the respective plug head and having a pair of apertures formed through the periphery thereof; and means for normally urging the sockets away from each other; the apertures come into registry with the respective through holes for letting the string through when the opposed sockets are fully compressed toward each other against the bias of the urging means.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 6:
FIG. 6 is a perspective view showing the cord stopper used to fasten the string wrapped around a waist of a garment.

As shown in FIG. 6, an inner hose 2 is arranged around a waistline of a ladies' garment. The inner hose 2 is defined as between an outer fabric of the garment and an lining cloth for insertion of a string 1 therethrough. A cord stopper according to the present invention is used for pulling taut and then fastening opposed ends of a string 3 inserted through the inner hose 2.

Figure 1:
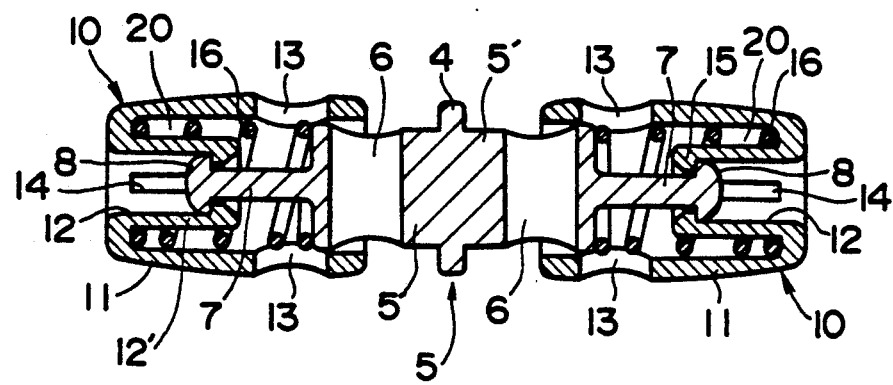
FIG. 1 is a longitudinal cross sectional view of a cord stopper according to the present invention.
Figure 2:
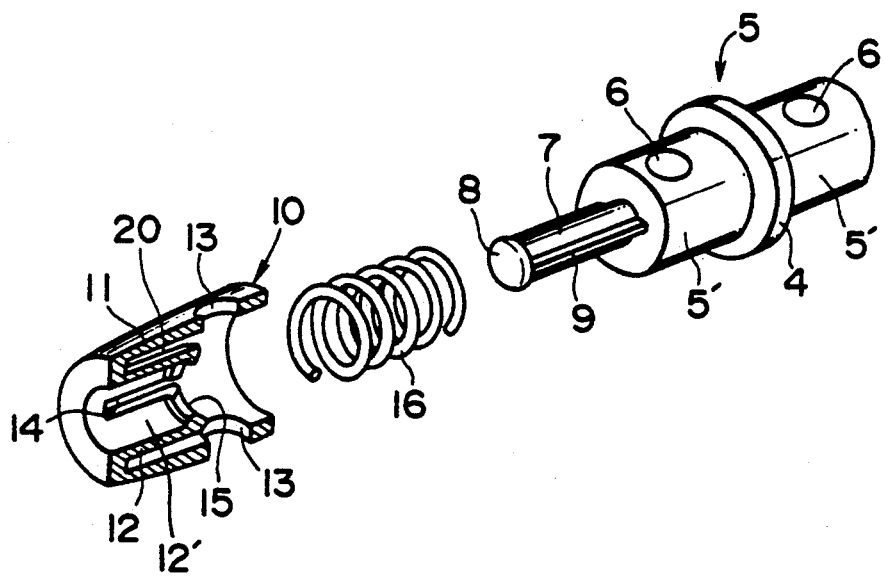
FIG. 2 is a fragmentary exploded view of the cord stopper of FIG. 1.

As shown in FIGS. 1 and 2, the cord stopper broadly comprises a double-headed plug 5, a pair of sockets 10, 10 capping the plug 5 from its opposed ends and a pair of compression coil springs 16, 16 each fit between the double-headed plug 5 and the respective socket 10 to urge the socket 10 remote from the double-headed plug 5.

The double-headed plug 5 is substantially in the shape of a cylinder and generally comprises a pair of plug heads 5', 5' integrally joined bottom-to-bottom; a middle annular flange 4 formed substantially on the middle around the periphery of the double-headed plug 5 in such a manner to divide the double-headed plug 5 into the plug heads 5' 5'; and a pair of central rods 7, 7 each extending axially from the distal end of the respective plug head 5'. Each central rod 7 has on its distal end a large-diametered cap 8 and on its periphery a plurality of ridges 9 extending axially thereof. The cap 8 is greater in diameter than the central rod 7. As shown in FIGS. 1 and 2, each plug head 5' has a through hole 6 formed through perpendicularly to the longitudinal axis of the double-headed plug 5. As better shown in FIG. 1, the double-headed plug 5 is symmetrical in respect of the middle annular flange 4.

Since each of the sockets 10, 10 is much the same in size and shape with the other, description concentrates on one socket 10.

As shown in FIGS. 1 and 2, the socket 10 generally comprises an outer hollow cylinder 11 having a pair of diametrically opposed apertures 13, 13 formed through the periphery thereof and an inner hollow cylinder 12 formed interiorly of the outer hollow cylinder 11 by folding back the outer hollow cylinder 11 at its distal end and terminating short of the apertures 13, 13. The outer and inner hollow cylinder 11, 12 define therebetween a cylindrical groove 20. The inner hollow cylinder 12 has in its periphery a plurality of 14 extending longitudinally thereof to thus provide a plurality of resilient flaps 12'. The resilient flaps 12' have inner rims 15 formed on the respective distal ends thereof and directed inward.

For assembling the cord stopper, first a compression coil spring 16 is fit into the cylindrical groove 20 of the socket 10. Then, the socket 10 with the compression coil spring 16 fit in the groove 20 is fit over the corresponding plug head 5' of the double-headed plug 5 and thrusted therein until the cap 8 wedges into the inner hollow cylinder 12 against the bias of both the resilient flaps 12' and the compression coil spring 16, which acts between the bottom of the cylindrical groove 20 of the socket 10 and the distal end of the plug head 5'. In this instance, the ridges 9 of the central rod 7 comes into engagement with the slits 14 of the inner hollow cylinder 12 for preventing the relative rotation of the plug 5 and the sockets 10, 10 on their longitudinal axes and the inner rims 15 of the socket 10 come into catching engagement with the large-diametered cap 8 of the central rod 7 for preventing the plug 5 from coming off the socket 10. Obviously, the prevention of the relative rotation of the plug 5 and the sockets 10, 10 advantageously facilitates insertion of the string 1 through the through holes 6 and the apertures 13, 13.

Figure 4:
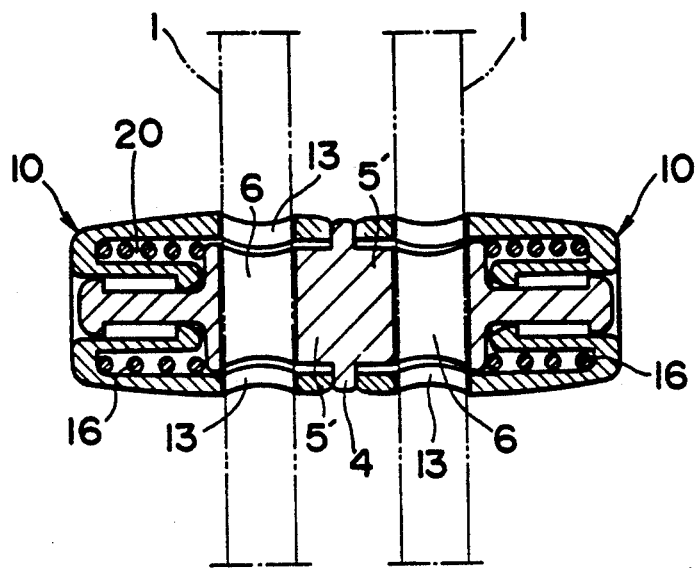
FIG. 4 is a cross-sectional view of the cord stopper of FIG. 1, showing a string being inserted through the cord stopper with opposed sockets compressed.

For fastening both ends of the string 1 by means of the cord stopper thus assembled, as better shown in FIG. 4, the opposed sockets 10, 10 are fully thrusted toward the respective plug heads 5', 5' that is, the sockets 10, 10 are fully compressed toward each other against the bias of the respective compression coil springs 16, 16 until the proximal ends of the sockets 10, 10 come into abutting engagement with the middle annular flange 4, whereupon each pair of diametrically opposed apertures 13, 13 are in registry with the respective through hole 6 and ready for insertion of the string 1.

Figure 5:
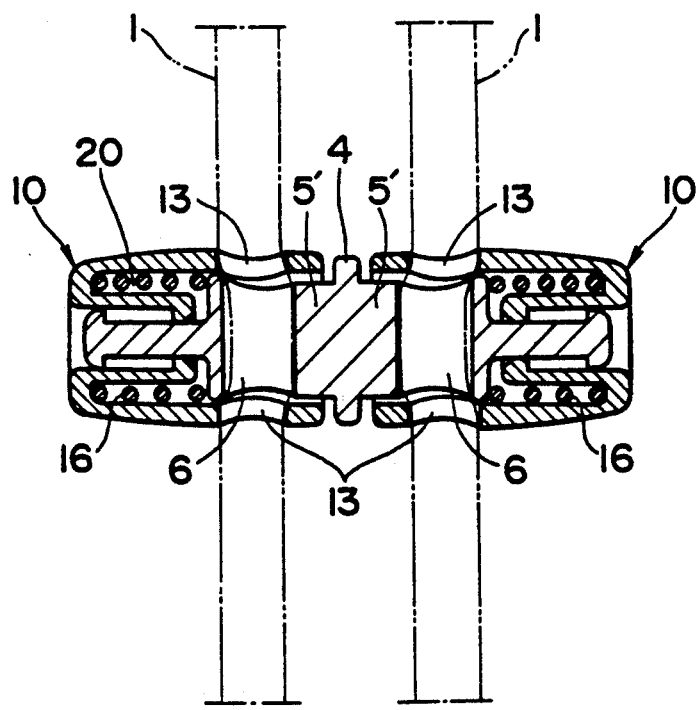
FIG. 5 is a view similar to FIG. 4 but showing the string to be fastened by the cord stopper with the sockets released.

After the stringer 1 is inserted into the apertures 13, 13 and the through hole 6, and pulled taut to the waist, the wearer releases the compression force from the sockets 10, 10 whereby the sockets 10, 10 tend to return to the original position under the bias of the compression coil springs 16, 16, as shown in FIG. 5. Since the apertures 13, 13 of the socket 10 and the through hole 6 of the plug head 5' come out of registry, the opposed ends of the string 1 are retentively caught by the edges of the apertures 13, 13 and the through hole 6.

Figure 3:
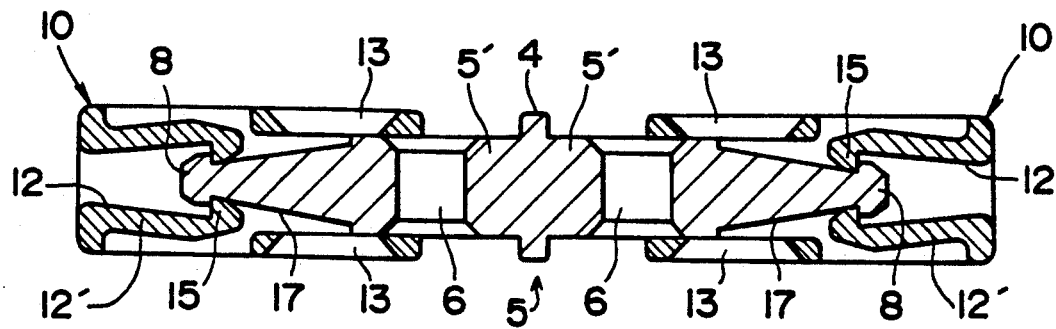
FIG. 3 is a view similar to FIG. 1 but showing another embodiment of the present invention.

FIG. 3 shows another embodiment of the present invention. This embodiment is substantially identical with the preceding embodiment with an exception that there is no compression spring between the plug 5 and the sockets 10 and the rods 7 having a substantially uniform diameter throughout their full length are replaced by a pair of convergent horn 17; that is, each of the convergent horns 17 extends axially from the distal end of the respective plug head 5', has its proximal portion considerably greater in diameter than the hole defined by the inner rims 15 of the socket 10 and converges toward the its distal end. The inner rims 15 of the resilient flaps 12' of the socket 10 come into resilient engagement with the convergent horn 17 of the plug 5 for urging the plug head 5' away from the socket 10. In this embodiment, the sockets 10, 10 are made of resilient material such as synthetic resin to provide enough resiliency for the resilient flaps 12'.

With the construction set forth hereinabove, the code stopper according to the present invention enjoys the following advantages.

A pair of through holes formed in the cord stopper for insertion of a string can be disposed much closer to each other. Therefore, opposed ends of the string coming out of a small opening of a garment hose converge into the closely juxtaposed holes of the cord stopper. This advantageously makes the string ends inconspicuous and enhances sightliness of the garment as a whole.

Furthermore, pulling the ends of the string through the close holes of the cord stopper can tighten the waistline of the garment, without the possibility of damaging the edge of the small opening of the garment hose.

Still furthermore, the ridges of the central rod comes into engagement with the slits of the inner hollow cylinder, thus preventing the relative rotation of the plug and the sockets on their longitudinal axes, thereby facilitating insertion of the string therethrough.

Yet furthermore, the inner rims of the socket come into catching engagement with the large-diametered cap of the central rod, thus preventing the plug from coming off the socket.

Obviously, various modifications and variations of the present invention are possible in the light of the above teaching. It is therefore to be understood that within the scope of the appended claims the invention may be practiced otherwise than as specifically described.

What is claimed is:

1. A cord stopper for fastening a string comprising a double-headed plug including a pair of plug heads integrally joined bottom-to-bottom with each other and a pair of through holes formed one through each plug heads perpendicularly to the longitudinal axis thereof; a pair of sockets each reciprocally fitted over the respective plug head and having a pair of apertures formed through the periphery thereof; and a pair of urging means each acting respectively between one said socket and plug head for normally urging the sockets away from each other; the apertures come into registry with the respective through holes for letting the string through when the opposed sockets are fully compressed toward each other against the bias of the urging means.

2. A cord stopper according to claim 1, each plug head including a rod axially extending from the distal end thereof, which rod has on its periphery a plurality of ridges extending axially thereof, each socket having an inner hollow cylinder formed interiorly of the socket remote from the plug, which inner hollow cylinder has a plurality of slits formed longitudinally thereof to provide a plurality of resilient flaps, the ridges coming into engaging with the slits.

3. A cord stopper according to claim 2, the rod having on its distal end a large-diametered cap and the resilient flaps having a plurality of inner rims extending inward from their respective distal ends and adapted for catching engagement with the largediametered cap.

4. A cord stopper according to claim 1, each urging means comprises a compression coil spring each acting between the socket and the respective plug head.

5. A cord stopper according to claim 1, each socket having an inner hollow cylinder formed interiorly of the socket remote from the plug, which inner hollow cylinder has a plurality of slits formed longitudinally thereof to provide a plurality of resilient flaps, each urging means having a convergent horn extending axially from the respective plug head and converging toward the distal end and an inner rim extending inward from the distal end of the respective resilient flaps for resilient engagement with the converging horn.

6. A cord stopper according to claim 1, the apertures being diametrically opposed to each other.

7. A cord stopper according to claim 1, the double-headed plug further including an annular flange formed substantially on the middle around the periphery of the double-headed plug, the proximal ends of the sockets coming into abutting engagement with the middle annular flange when the sockets are fully compressed toward each other against the bias of the urging means.

8. A cord stopper according to claim 7, the double-headed plug being symmetrical in respect of the annular flange.

* * * * *